United States Patent [19]
Burley

[11] B 3,952,708
[45] Apr. 27, 1976

[54] ROTOR MOUNTED SPARK PLUG FOR ROTARY ENGINE
[75] Inventor: Harvey A. Burley, Warren, Mich.
[73] Assignee: General Motors Corporation, Detroit, Mich.
[22] Filed: Oct. 16, 1973
[21] Appl. No.: 406,800
[44] Published under the Trial Voluntary Protest Program on January 28, 1975 as document no. B 406,800.

[52] U.S. Cl. ............................................. 123/8.09
[51] Int. Cl. ........................................... F02b 53/12
[58] Field of Search............ 123/8.09, 8.45, 169 EB, 123/163

[56] References Cited
UNITED STATES PATENTS
3,762,377   10/1973   Anthony et al................ 123/8.09 X Primary Examiner—Carlton R. Croyle
Assistant Examiner—Michael Koczo, Jr.
Attorney, Agent, or Firm—Charles R. Engle

[57] ABSTRACT

A rotary combustion engine rotor having spark plug receiving recesses formed in its respective peripheral faces, each recess removably mounting an elongated spark plug assembly. The elongated spark plug assembly is configured for insertion and removal through either an exhaust port in the engine housing or through an access port in the housing, the latter being closed by a suitable plug having a thickness less than the engine housing. The provision of an elongated plug having one or more spark gaps provides a means for mounting the spark plug assembly on the rotor and for the insertion and removal thereof without engine disassembly.

5 Claims, 7 Drawing Figures

ROTOR MOUNTED SPARK PLUG FOR ROTARY ENGINE

This invention relates to mounting spark plugs in rotary combustion engines and more particularly to a rotary combustion engine having spark plugs releasably mounted in each peripheral surface of a generally triangular shaped rotor rotatably mounted within the engine.

Use of rotary combustion engines has indicated it is particularly desirable to employ two spark plugs to obtain maximum power in engines of the rotary type. Two spark plugs to ignite each compressed charge has been determined necessary as a result of a rapid rotation of the rotor, the pressure differential that exists between the leading and trailing portions of the contracted working chamber and the high velocities of the gas in the direction of rotor rotation as compared to slow velocities in a direction opposite to rotor rotation. All of these factors combine to require a longer burn time than is available in normal engine operation so that the power output of the engine is seriously effected. A solution to this problem is the provision of two spark plugs, one being located upstream of the other so that the engine is provided with a leading and a trailing plug. The timing of firing of these plugs can be regulated to provide maximum combustion in the compression chamber. The use of two plugs mounted in the engine housing creates additional problems and has certain disadvantages as compared to use of a single plug. Obviously initially, use of two plugs require a more complex ignition system and if the timing is substantially different then two separate spark initiating circuits are required. A further disadvantage of use of two plugs in the engine housing results from loss of cooling channels in the area where the spark plugs are mounted. The engine is more severely heated in these areas and necessarily requires more cooling making the loss of cooling channels at these particular points significant.

The rotor mounted spark plug arrangement of the subject invention requires the formation of a spark plug assembly receiving recess in each peripheral face of the rotor, the recess being configured to receive and retain a specifically configured spark plug assembly. The spark plug assembly of this invention includes a ceramic body having a mounting plate secured to one end and a cavity formed in the other end for disposition over a fixed electrical contact member secured in the rotor. The ceramic body member can be molded containing an electrode having one or more spaced gaps or the electrode can be adhered thereto so that when the spark plug assembly is placed in the rotor recess, the cavity end receiving the fixed electrical contact in the rotor slips under a lip portion of the rotor while the mounting plate is secured to the rotor by conventional fastening means at the other end. In this manner the spark plug assembly is positively attached to the rotor. The elongated spark plug assembly is configured so that it can be inserted and removed through an exhaust passage in the engine housing when the rotor is properly aligned therewith. In a modified embodiment, the engine housing can be provided with a tapped opening receiving a threaded plug having a thickness slightly less than the rotor housing preventing the plug from extending interiorly of the housing into the rotor working chamber. The threaded plug can readily be removed, the rotor aligned with the tapped opening, a spark plug assembly removed from the rotor and another assembly inserted and secured without disassembly of the engine. It is not necessary to this invention that the access opening be threaded to receive a threaded plug as it may be selectively opened and closed via a plug member incorporating any suitable fastening means. With respect to the mode of fastening the spark plug assembly to the rotor via the mounting plate, this can either be accomplished by utilization of tapped holes in the rotor and threading machine bolts through the mounting plate, or a toggle clamp type fastening mechanism can be utilized.

The aforementioned recess formed in the peripheral faces of the rotor can be of various designs. In one embodiment the rotor face is machined providing a somewhat concave groove receiving the elongated spark plug assembly, the surface of the rotor terminating in a laterally extending face with an overlying lip integral with the rotor. The cavity end of the elongated plug is inserted underneath the lip receiving the fixed electrical contact secured in an integral rotor face providing an electrical connection to the electrode. The overlying lip is effective to secure the plug cavity end to the rotor. The electrode extends through the plug ceramic body and engages the mounting plate providing a ground connection when the mounting plate is fastened to the rotor.

Accordingly, a first object of the present invention is the provision of a new and improved rotor mounted spark plug assembly having ease of accessibility.

Another object of the present invention is the provision of an elongated spark plug assembly configured for mounting upon a peripheral surface of a rotary combustion engine rotor, the spark plug assembly being adaptable to include one or more spark gaps in a single electrode arrangement.

Another object of the present invention is the provision of a rotary engine rotor having recesses formed in the peripheral surfaces thereof for receipt of an elongated spark plus assembly providing a plurality of spark gaps along the surface of the spark plug, the gaps producing sparks capable of igniting the fuel mixture at spaced points along the peripheral surface of the rotor for more complete combustion.

Another object of the subject invention is the provision of a rotary engine rotor having a recess machined in each peripheral surface thereof configured to secure a mating elongated spark plug assembly, the spark plug assembly being of such a size and shape that it can be inserted and removed through an exhaust passage in the engine housing.

A further object of the subject invention is the provision of spark plug mounting recesses in the peripheral surfaces of a rotary engine rotor, the spark plug assembly being elongated in form and containing a cavity in one end while having a mounting plate affixed to the other end, each recess in the rotor being configured to receive and retain the cavity end of the spark plug and the mounting plate engaging a mating rotor surface for attachment thereto so that the spark plug may be released and removed by inserting a tool through an engine housing exhaust passage.

Another object of the subject invention is the provision of a spark plug receiving recess in each peripheral surface of a rotary engine rotor, the recess including a socket at one end and a retaining abutment near the other end so that an elongated spark plug assembly including an electrode having spaced spark gaps and containing a cavity in one end which is recieved in the socket, a mounting plate being attached at the other end of the plug for releasably engaging the retaining abutment so that the spark plug assembly is releasably secured to the rotor, the spark plug assembly being capable of insertion and removal through an exhaust passage in the engine housing.

A still further object of the subject invention is the provision of a spark plug receiving recess in a rotary engine rotor, the recess receiving an elongated spark plug assembly, one end of the assembly being retained in the recess by a socket formed integral with the rotor while the other end of the assembly is retained via engagement of a mounting plate with a releasable fastening mechanism, the engine housing including an access port selectively closed by the insertion of a suitable plug, the access port being located for alignment with a peripheral surface of the rotor providing for release, removal and insertion and securing of the spark plug assembly to the rotor as desired.

The novel features which I believe to be characteristic of my invention are set forth with particularity in the appended claims. My invention itself, however, both as to its organization and method of operation, may be best understood by reference to the following description taken in connection with the accompanying drawings in which:

Figure 1:
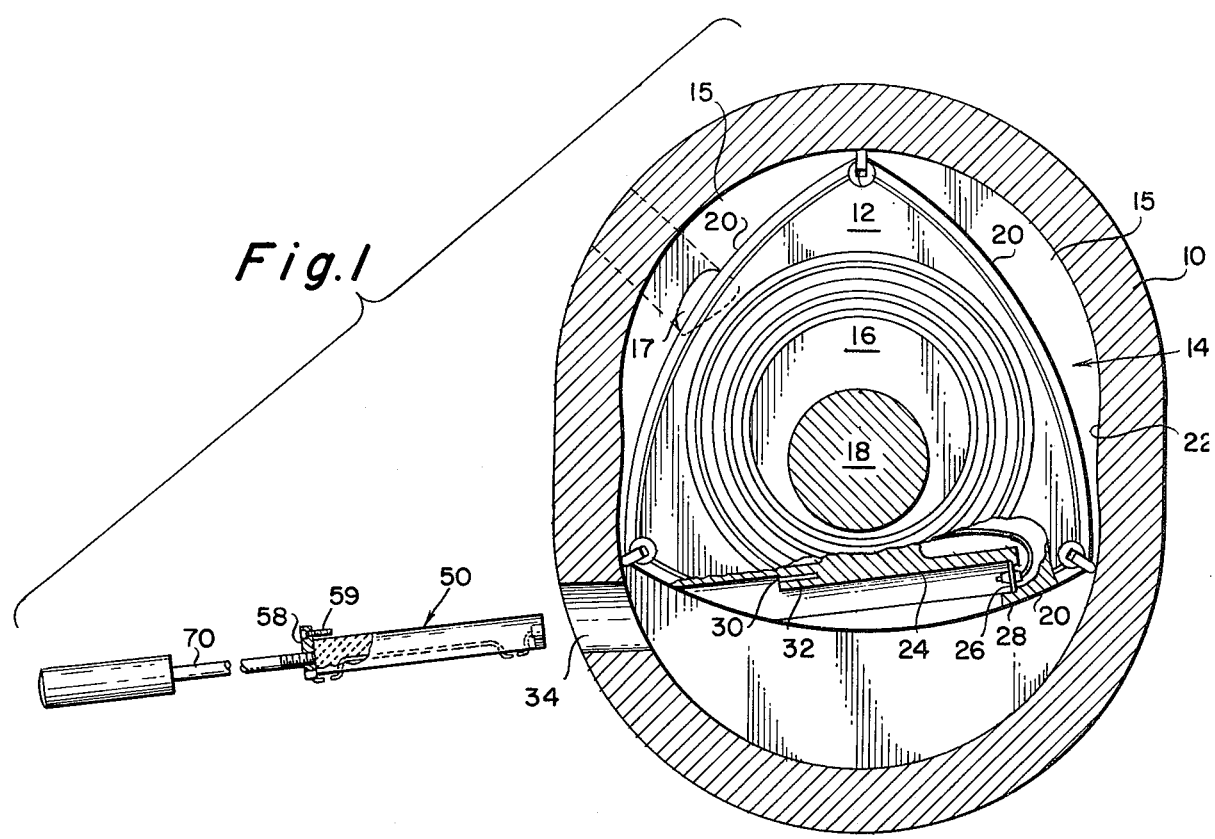
FIG. 1 is a transverse sectional view of an internal combustion rotary engine incorporating one embodiment of the spark plug mounting arrangement of the subject invention.

Referring now to FIG. 1, a rotary internal combustion engine including a housing 10 rotatably receiving rotor 12 is shown. The rotor 12 is mounted for rotation within cavity 14 on an eccentric 16 of an output shaft 18. The rotor 12 includes two or more peripheral surfaces 20 and as each of these surfaces complete a revolution within the cavity 14 they form working chambers 15 of varying volume so as to compress an air-fuel mixture supplied through an intake passage 17 for combustion when a particular rotor surface 20 is in its closest proximity to a minor diameter portion 22 of the housing 10 as is determined by an ignition timing system, not shown.

The rotor 12, in each peripheral surface 20, includes a machined spark plug receiving recess 24 which termi-nates in a socket portion 26 defined by a lip 28 integral with the rotor 12. The recess 24 also includes a stepped abutment 30 which in one embodiment contains at least one tapped hole 32 for a purpose to be later described. The engine housing 10 contains an exhaust passage 34 which provides a means of access to the spark plug receiving cavity 24 as also will be later described in detail.

Figure 2:
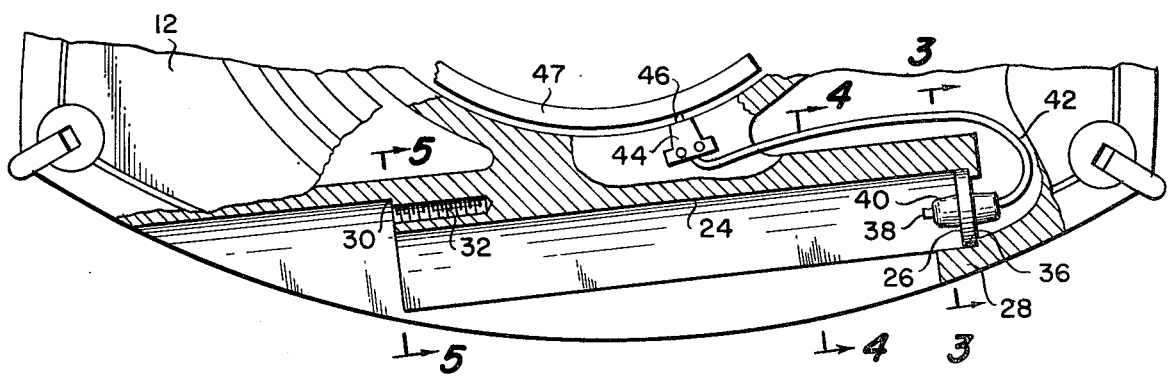
FIG. 2 is an enlarged fragmentary sectional view of a rotor and engine housing illustrating the elongated spark plug mounting arrangement of FIG. 1.
Figure 3:
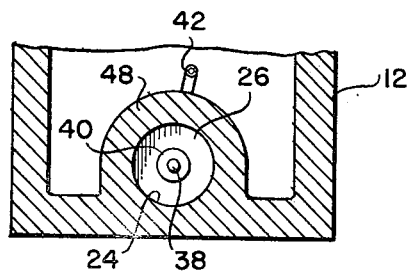
FIG. 3 is a fragmentary cross sectional view taken on line 3—3 of FIG. 2 illustrating the form of a portion of the rotor spark plug receiving recess.
Figure 4:
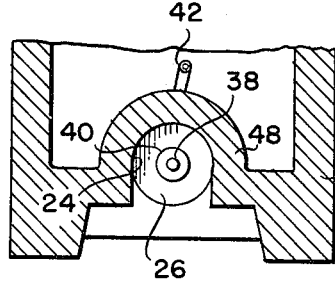
FIG. 4 is a fragmentary cross sectional view taken on line 4—4 of FIG. 2 illustrating the configuration of a rotor spark plug receiving recess near the mid portion thereof.

The spark plug receiving recess 24 is best illustrated in FIG. 2 which is a fragmentary portion of a sectional view of the rotor 12. The socket 26 includes a bottom wall 36 which supports an electrical contact 38 secured in an insulator member 40, the contact member 38 being connected with a conductor 42 that in turn is connected with a rotor pickup electrode assembly 44 comprising a contact member 46 in engagement with a conductive ring 47 mounted on the engine crankshaft 18. As illustrated in FIG. 3, the socket 26 is circular in form and is effective to create a supporting surface for one end of a spark plug assembly which will be later described in detail. With reference again to FIG. 2, the socket 26 is integrally formed within rotor 12 and supports the contact 38 in a central position therein. As shown in FIG. 4, the spark plug receiving recess 24 includes an arcuate cradle portion 48 which snugly receives a spark plug mounted in the rotor so as to prevent vibration and shock loading to the assembly.

Figure 5:
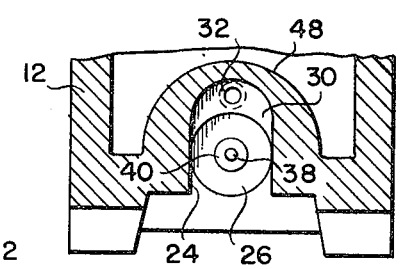
FIG. 5 is a fragmentary cross sectional view taken on line 5—5 of FIG. 2 illustrating an end portion of the rotor spark plug receiving recess illustrating one form of a fastening arrangement.

FIG. 5 illustrates the abutment 30 containing at least one tapped hole 32 for retaining the spark plug assembly in a fixed position. In one embodiment the spark plug assembly includes a mounting plate utilizing machine bolts to engage the tapped holes 32 to affix the spark plug within recess 24. It is apparent, however, that any conventional fastening means could be used to secure the spark plug assembly within the recess 24 including toggle clamp devices or other conventional fastening devices.

Figure 6:
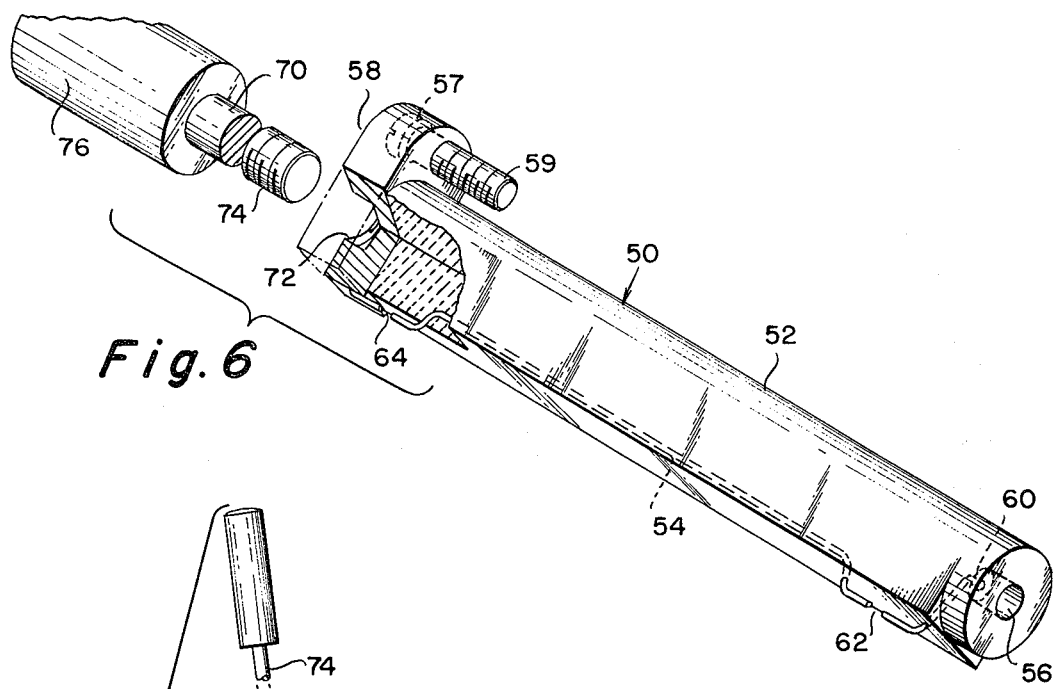
FIG. 6 is a perspective view of an elongated spark plug assembly, prior to attachment of a hand tool, suitable for use with a rotary engine rotor in accordance with my invention.

In FIG. 6, an elongated spark plug assembly 50 includes a ceramic body member 52 containing an electrode 54. The ceramic body member 52 contains a cavity 56 in one end thereof and has a metal mounting plate 58 secured to its other end. A counterbore 57 containing a machine screw 59 is provided in mounting plate 58 for fastening the plate against abutment 30 in recess 24. The machine screw is threadably received in tapped hole 32. The electrode 54 has an electrical contact member 60 positioned in the bottom of recess 56 and further includes two spaced spark gaps 62 and 64, the electrode adjacent the latter being connected to mounting plate 58 for a ground connection. The ceramic body 52 is circular in form and is of a size such that it is snugly received within cradle 48 of recess 24.

Figure 7:
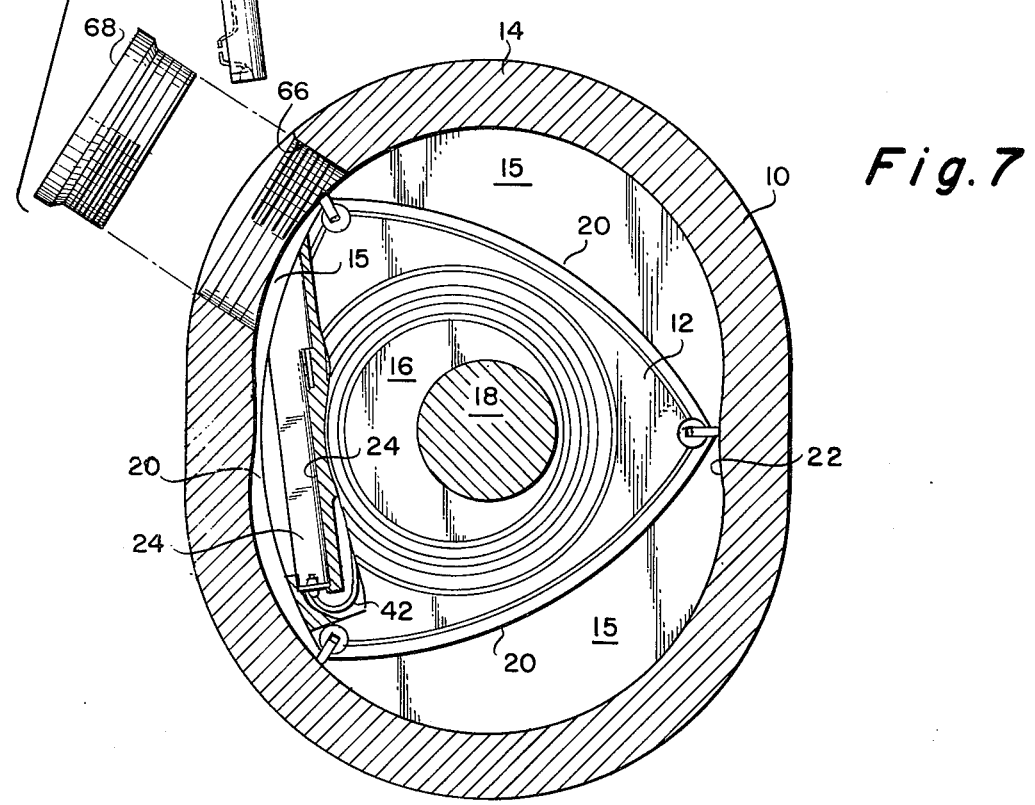
FIG. 7 is a transverse sectional view of a rotary internal combustion engine incorporating modified means of providing access to a rotor mounted spark plug for insertion and removal thereof.

A modified form of the subject invention is illustrated in FIG. 7, wherein the engine housing 10 includes an access port 66 which is selectively closed by a suitable plug 68. In the illustrated form, the port 66 is threaded to receive a threaded plug 68, but of course any suitable means for fastening the plug in the port could be used. The plug 68 is of a thickness less than that of engine housing 10 so that when the plug is secured therein it does not extend within cavity 14 wherein the rotor 12 rotates. In this arrangement, the spark plug receiving recess 24 in each of the peripheral faces 20 of the rotor 12 can be aligned with the access port 66 so that the spark plug assembly 50 can readily be removed from the cavity 24 by a suitable tool such as tool 70 and a new spark plug can be inserted therein without disassembly of any of the engine structure. The mounting plate 58 contains a tapped recess 72 which receives threaded end 74 of the tool 70 as is best shown in FIG. 6. The tool 70 includes a handle 76 for rotating end 74 into recess 72 and for supporting the spark plug assembly during installation and removal of the plug assemblies 50.

From the above description it is apparent that in a rotary engine having the spark plug receiving recesses 24 formed in the respective rotor surfaces 20 it is possible to align the rotor surfaces 20 and the recesses 24 with exhaust passage 34 so that a spark plug assembly 50 can readily be removed from the rotor surface by a suitable tool such as the tool 70, and a new plug assembly 50 can be inserted without requiring disassembly of the engine. This arrangement obviously affords an efficient and practical method of retaining a spark plug assembly upon a peripheral surface of the rotor 12 in a rotary combustion engine. This feature is particularly significant since use of rotary combustion engines has determined that it is desirable to have at least two points of ignition in a particular working chamber to attain efficient combustion of the air-fuel mixture. It is obvious that the spark plug assembly 50 can readily include two or more spark gaps in an electrode affixed therein.

Mounting of the spark plug assembly upon the rotor also affords the advantages of not having to reduce the cooling passages in the area of combustion which, of course, is the area in which the engine receives the most heat during operation and consequently is most likely to encounter structure failure as a result thereof. Another advantage of mounting the spark plug assembly upon the rotor surfaces resides in the fact that it is not necessary to provide additional cavities in the engine housing 10 which connect with the cavity 14 wherein the piston during its rotation defines the working chambers of varying volume. This is significant because the rotor apex seals encounter a substantially increased rate of wear when they are required to run across apertures in the peripheral surfaces defining the cavity 14.

While I have shown and described a specific embodiment of the present invention it will, of course, be understood that various modifications and alternative constructions may be made without departing from its true spirit and scope. In particular, it is possible to vary the configuration of the spark plug assembly 50 as well as the mounting recess 24 in the peripheral surfaces 20 of the engine rotor 12. The only limitation upon these dimensions and configurations resides in the fact that the spark plug assembly must be of such size and shape that it can be readily inserted through and removed from exhaust passage 34 or the access port 66. I, therefore, intend by the appended claims to cover all such modifications and alternative constructions as fall within the true spirit and scope of my invention.

I claim:

1. In a rotor mounted spark plug for a rotary combustion engine, the engine comprising a housing having a cavity, a rotor disposed in said cavity, said rotor having a plurality of adjoining peripheral faces, an output shaft rotatably supported by said housing and having an eccentric rotatably supporting said rotor, said rotor peripheral faces and said housing cooperatively providing a plurality of variable volume working chambers spaced around said rotor that move with said rotor within said housing, intake passage means periodically connected to said working chambers as said rotor moves, exhaust passage means periodically connected to each of said working chambers as said rotor moves; the improvement comprising: said rotor peripheral faces each having an elongated spark plug receiving recess extending laterally thereacross an elongated spark plug assembly mating with and being slidably and removably positioned in said recess and having one or more spaced spark caps, and means releasably retaining said spark plug in said recess during engine operation, said means being operable to release said spark plug for slidable removal and insertion of said spark plug assembly out of and into said laterally extending recess through said exhaust passage means.

2. A rotor mounted spark plug for a rotary combustion engine, the engine comprising a housing having a cavity, a rotor disposed in said cavity, said rotor having a plurality of adjoining peripheral faces, an output shaft rotatably supported by said housing and having an eccentric rotatably supporting said rotor, said rotor peripheral faces and said housing cooperatively providing a plurality of variable volume working chambers spaced around said rotor that move with said rotor within said housing, intake passage means periodically connected to said working chambers as said rotor moves, exhaust passage means periodically connected to each of said working chambers as said rotor moves; the improvement comprising: said rotor peripheral faces having a spark plug mounting recess formed therein, one end of said recess terminating in a lateral face, a lip formed in said rotor overlying the outer end of said face, an elongated spark plug assembly mating with and being positioned in said recess, said elongated spark plug including a ceramic body member, a mounting plate secured to one end of said ceramic body member, the other end of said elongated spark plug containing a cavity, an electrode affixed in said ceramic body member, said electrode terminating in an electrical contact exposed in the bottom of said cavity, a fixed electrical contact positioned in said recess lateral face, the contact in said spark plug assembly engaging said fixed contact in said lateral face when the spark plug assembly is positioned in said recess, and fastening means in said mounting plate accessible through said exhaust means whereby said elongated spark plug assembly including said mounting plate can be removed through said exhaust means and installed therethrough as required for proper engine operation.

3. A rotor mounted spark plug for a rotary combustion engine as described in claim 2 further comprising the provision of a tapped recess in said mounting plate for receipt of a threaded end of a hand tool supporting said spark plug assembly during insertion into and removal from said engine.

4. A rotor mounted spark plug for a rotary combustion engine, the engine comprising a housing having a cavity, a rotor disposed in said cavity, said rotor having a plurality of adjoining peripheral faces, an output shaft rotatably supported by said housing and having an eccentric rotatably supporting said rotor, said rotor peripheral faces and said housing cooperatively providing a plurality of variable volume working chambers spaced around said rotor that move with said rotor within said housing, intake passage means periodically connected to said working chambers as said rotor moves, exhaust passage means periodically connected to each of said working chambers as said rotor moves; the improvement comprising: said rotor peripheral faces having a spark plug receiving recess formed therein, an elongated spark plug assembly mating with and being releasably positioned in said recess, said spark plug assembly including a ceramic body member, a mounting plate secured to one end of said body member, a cavity in the other end of said body member, an electrode in said ceramic body member being connected to said mounting plate and terminating in an exposed electrical contact member in said cavity, said electrode containing at least one spark gap, said rotor peripheral face recess terminating in a laterally extending face with an overlying lip integrally formed therein, an insulated electrical conductor member secured in said rotor, an electrical contact fixed to said lateral face and connected to said conductor, an electrical rotor pickup electrode mounted in said rotor for engagement with an electrically conducting member supplying current thereto, said electrical conductor connecting said pickup with said fixed contact, said ceramic body cavity being configured to fit over said fixed contact while said ceramic body member fits underneath said overlying lip for retaining one end of said body member in said rotor, and fastening associated with said mounting plate for releasably securing said spark plug assembly to said rotor for insertion and removal through said exhaust passage means.

5. A rotor mounted spark plug for a rotor combustion engine, said engine comprising a housing having a cavity, a rotor disposed in said cavity, said rotor having a plurality of adjoining peripheral faces, an output shaft rotatably supported by said housing and having an eccentric rotatably supporting said rotor, said rotor peripheral faces and said housing cooperating to provide a plurality of variable volume working chambers spaced around said rotor that move with said rotor within said housing, each of said rotor peripheral faces having a spark plug mounting recess formed therein, one end of said recess terminating in a lateral face, an elongated spark plug assembly mating with and being positioned in said recess, means integral with said rotor securing one end of said elongated spark plug assembly, a mounting plate secured to the other end of said elongated spark plug assembly, fastening means securing said mounting plate to said rotor, said engine housing having an access port therein, and a plug member closing said access port when secured to said housing, said plug member having a thickness less than that of said housing, the access port providing for insertion and removal of an elongated spark plug assembly therethrough when said rotor is rotated to align said recess with said port.

* * * * *